Patented June 19, 1928.

1,673,877

UNITED STATES PATENT OFFICE.

HERBERT J. KRASE, OF CLARENDON, VIRGINIA, AND HARRY C. HETHERINGTON AND ALFRED T. LARSON, OF WASHINGTON, DISTRICT OF COLUMBIA, ASSIGNORS TO ARTHUR B. LAMB, TRUSTEE.

PROCESS FOR THE PURIFICATION OF GASES.

No Drawing.   Application filed March 2, 1926.   Serial No. 91,835.

This invention relates to the removal of acidic constituents from gaseous mixtures and more specifically to the removal of carbon dioxide from hydrogen or hydrogen-nitrogen mixtures intended for the direct synthesis of ammonia.

It is generally known that certain methods of preparing nitrogen-hydrogen mixtures for the direct synthesis of ammonia, such as the water-gas, the producer-gas, and the carbon monoxide-steam conversion processes, involve the removal of carbon dioxide as an essential step in the purification of the gases before synthesis can be carried out.

In preparing nitrogen-hydrogen mixtures for the ammonia synthesis, carbon dioxide has generally been removed from the gas mixtures by scrubbing it with water at high pressure. This method involves the expenditure of relatively large quantities of energy not only in the compression of the carbon dioxide, but also in the injection of the scrubbing water into the high pressure system. Although some of this energy is recovered when the water containing the carbon dioxide is discharged from the high pressure system, the losses are nevertheless great. Another disadvantage of the high pressure scrubbing with water results from the relatively large loss of nitrogen and hydrogen due to the appreciable solubility of these gases in water. As much as 10% of the nitrogen-hydrogen gases involved is lost during this operation. Another disadvantage is encountered when the carbon dioxide is to be used in other processes which require a pure gas, as, for example, the manufacture of synthetic urea from ammonia and carbon dioxide, the carbon dioxide obtained by the water-scrubbing is not of sufficient purity to be used directly, but must itself be subjected to purification.

Attempts have been made to improve upon the high pressure water-scrubbing method for removing carbon dioxide. For example, Clancy (U. S. Patent No. 1,425,577) has recommended the use of an aqueous ammonia solution for this purpose, the carbon dioxide being converted into a carbonate and removed as such. It is obvious that this process involves the use of large quantities of ammonia and when carried out in connection with the direct synthetic ammonia process may necessitate the conversion of an undesirably large part of the ammonia produced into ammonium carbonate.

L'Aire Liquide (French Patent No. 570,121) has suggested the removal of carbon dioxide by treating the compressed mixture of impure gases with a dilute aqueous solution of ammonia and subsequently regenerating the liquid by heat. The regeneration of such a solution is not readily accomplished, however, because the partial pressures of the ammonia and the carbon dioxide above such solutions are too nearly alike. It has been found that when the ammonia solution contains a dissolved ammonium salt other than the carbonate, the partial pressure of carbon dioxide is increased markedly with increasing temperatures, with the result that liberation of the carbon dioxide is readily accomplished. The partial pressure of the ammonia, however, remains essentially the same and as a consequence there is no appreciable loss of this gas during the regeneration of the absorbing solution. Because of the relatively high solubility of $CO_2$ in such a solution at room temperature, it is no longer necessary to operate at elevated pressures, although such pressures may be employed when other conditions of operation make it desirable. The carbon dioxide obtained during the regeneration of the solution may be used directly where a gas of high purity is desired. It is evident that this improved process does not involve the use of considerable quantities of ammonia. As a consequence, the ammonia produced by the synthesis operation is not required for the purification step in the process, but is available for any desired purpose.

The following example will serve to illustrate our invention:

A nitrogen-hydrogen gas mixture containing, for example, 30% of carbon dioxide, is passed through a gas scrubbing tower, counter current to a solution of an ammonium salt containing ammonia, at or about room temperature. The volume of solution employed depends of course upon the effectiveness of the scrubbing tower, and in addition varies with the amount of ammonia in solution and the carbon dioxide content of the gas, to be purified. In practice, we have reduced the carbon dioxide content of a gas mixture originally containing 30% $CO_2$ to less than 0.1% $CO_2$. We have found, using suitable concentrations, of ammonia (say 10–60 grams $NH_3$ per liter) in the solution, that the issuing gas will contain not more than 2.0 per cent of carbon dioxide and frequently as low as 0.1 per cent. together with some ammonia. Although ammonium salts other than the nitrate may be employed, and although the concentration of the salt may be varied within wide limits, we prefer to operate with an ammonium nitrate solution containing from 30 to 50% by weight of this salt. If it is desirable to remove the ammonia from the gas issuing from the tower, this can be readily accomplished by scrubbing the gas with a small amount of water or aqueous ammonium nitrate. This latter solution may be either regenerated separately or combined with the main body of solution used for scrubbing the original mixed gases.

If, now, the solution issuing from the base of the tower be heated, the carbon dioxide will be expelled. The rate of evolution of carbon dioxide depends upon the pressure and the temperature, the latter may vary from 60° C. to 100° C. depending on the pressure and the carbon dioxide content of the solution. The heating can be conveniently accomplished by allowing the solution containing the carbon dioxide to flow down through a regenerator provided with steam coils at the base which serve to heat the solution. By operating in this manner, the carbon dioxide issuing from the top of the regenerator will be found to be substantially pure, except for small amounts of ammonia and water. Practically complete removal of the ammonia may be effected by scrubbing the gas with a small amount of water or aqueous ammonium nitrate solution. In the latter case, the aqueous ammonium nitrate may be also treated in the same regenerator for removal of its carbon dioxide.

We have also found that an effective removal of carbon dioxide may be obtained by operating the scrubbing apparatus under pressure. In fact, we have found that by increasing the pressure up to 25 atmospheres the weight of carbon dioxide absorbed by a given volume of solution is materially increased.

After the solution flows from the bottom of the regenerator, it need only be cooled, after which it can again be used to remove carbon dioxide from the converter gases, thus operating in a substantially continuous manner.

For purposes of this exposition, we have confined ourselves to a description of the application of our process to the purification of the gases intended for the synthesis of ammonia. However, it will be seen that this process is applicable to the concentration of acidic gases such as $CO_2$, $H_2S$, etc., when present in any other gases, provided that the latter gases are inert with respect to ammonia, i. e., do not form compounds or salts with ammonia under the conditions of operation.

We claim:

1. The process of removing carbon dioxide from gases by bringing the gas mixture into contact with an aqueous ammoniacal solution of an ammonium salt other than the carbonate.

2. The process of removing carbon dioxide from gases intended for the synthesis of ammonia by bringing the gas mixture into contact with an aqueous ammoniacal solution of an ammonium salt other than the carbonate and expelling the carbon dioxide by heating the solution.

3. The process of removing carbon dioxide from a gas mixture by scrubbing the gas mixture with an aqueous ammoniacal solution of an ammonium salt other than the carbonate, removing the dissolved carbon dioxide by heating, cooling the solution and again using it to scrub additional gas.

4. The process of continuously removing carbon dioxide from a gas stream containing it by passing the gas through a scrubbing apparatus counter-current to an ammoniacal aqueous solution of an ammonium salt other than the carbonates, removing the carbon dioxide absorbed by the solution by heating, then cooling the solution and returning it to the gas scrubbing apparatus.

5. The process of continuously removing carbon dioxide from gas mixtures containing it by passing the gas through a scrubbing apparatus counter-current to an aqueous ammoniacal solution of ammonium nitrate, containing prior to the introduction of ammonia and carbon dioxide over 10% by weight of ammonium nitrate, removing the absorbed carbon dioxide by heating the solution, then cooling the solution and returning it to the gas scrubbing apparatus.

6. The process of removing and recovering carbon dioxide from gases intended for the synthesis of ammonia by bringing the gas mixture into contact with an aqueous ammoniacal solution of an ammonium salt other than the carbonate, expelling the carbon dioxide by heating the solution, and recovering the carbon dioxide.

7. The process of preparing carbon dioxide of a high degree of purity from an impure mixture of carbon dioxide and inert gases, by scrubbing the impure gas with an aqueous solution of ammonium nitrate containing ammonia, removing the carbon dioxide from solution by heating to a temperature between 60° C. and 100° C., and recovering the carbon dioxide.

8. The process of preparing carbon dioxide of a high degree of purity from an impure mixture of carbon dioxide and inert gases, by scrubbing the impure gas with an ammoniacal aqueous solution of ammonium nitrate, expelling the dissolved carbon dioxide by heating the solution to a temperature between 60° and 100° C., scrubbing the carbon dioxide to remove traces of ammonia therefrom, and recovering the carbon dioxide.

9. The process of removing carbon dioxide from gases intended for the synthesis of ammonia by scrubbing the gas mixture under pressures up to 25 atmospheres with an aqueous solution of an ammonium salt other than the carbonates.

10. The process of removing carbon dioxide from gases intended for the synthesis of ammonia by scrubbing the gas mixture under pressures up to 25 atmospheres with an aqueous ammoniacal solution of an ammonium salt other than the carbonates, then regenerating the solution by heating.

11. The process of removing carbon dioxide from gases intended for the synthesis of ammonia by scrubbing the gas mixture under pressures up to 25 atmospheres with an aqueous solution of an ammonium salt other than the carbonates, then regenerating the solution by reducing the pressure and heating the solution.

12. The process of removing and recovering carbon dioxide from gases intended for the synthesis of ammonia, by scrubbing the gas mixtures under pressures up to 25 atmospheres with an aqueous ammoniacal solution of an ammonium salt other than the carbonates, expelling the carbon dioxide by reducing the pressure and heating the solution, and recovering the carbon dioxide.

13. The process of removing and recovering from a mixture with inert gases containing them, those acidic gases which form readily dissociable compounds with ammonia, by bringing the gas mixture into contact with an aqueous ammoniacal solution of an ammonium salt, other than the salt of the acidic gas to be separated, then expelling and recovering the acidic gas.

HERBERT J. KRASE.
HARRY C. HETHERINGTON.
ALFRED T. LARSON.